April 19, 1960
R. R. KELLER
2,933,167
PANEL JOINTS AND PANEL JOINING DEVICES
Filed Oct. 4, 1955
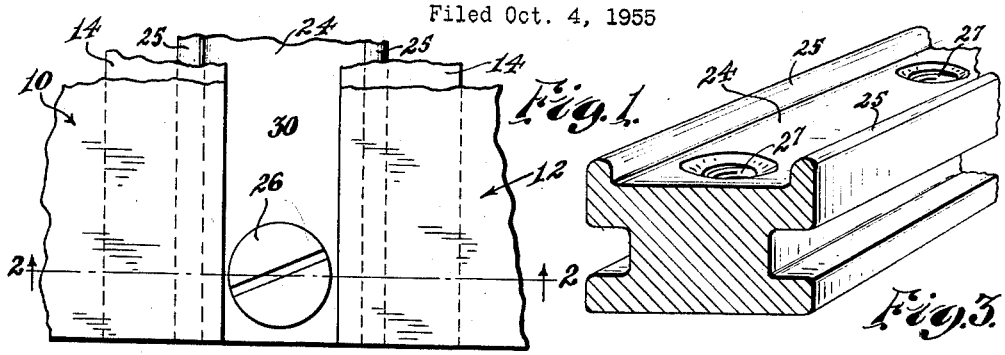
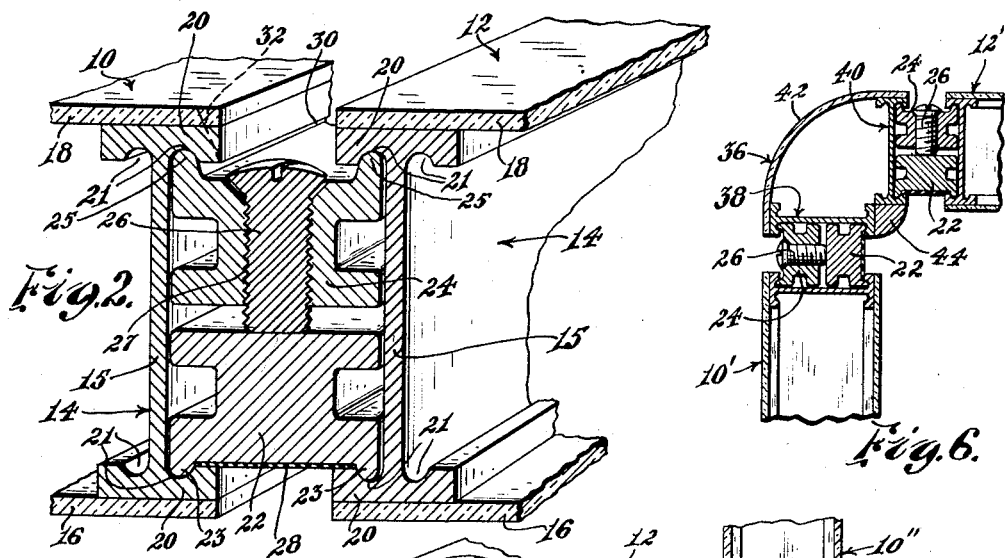
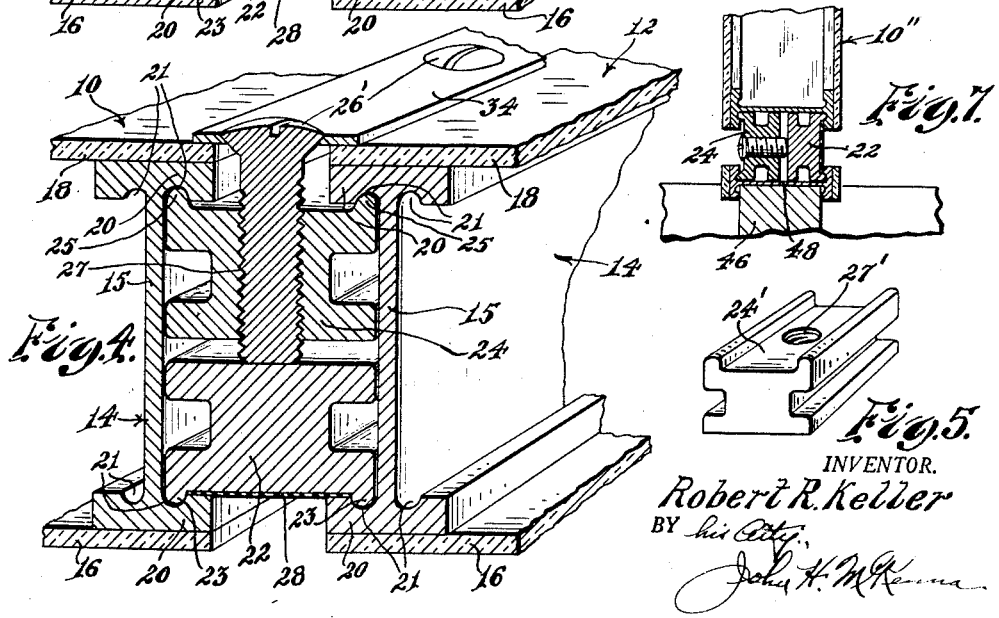
INVENTOR.
Robert R. Keller
BY his atty.,
John H. McKenna

United States Patent Office 2,933,167
Patented Apr. 19, 1960

2,933,167
PANEL JOINTS AND PANEL JOINING DEVICES

Robert R. Keller, Manchester, N.H.

Application October 4, 1955, Serial No. 538,359

4 Claims. (Cl. 189—36)

This invention relates to improvements in panel joints and panel joining devices. More particularly, the invention provides improved means for effecting a connection between adjacent edge portions of adjacent panels and between panel edge portions and panel-supporting members. The invention is primarily concerned with mounting and joining structural panels which are to constitute walls, partitions, floors or ceilings of buildings but the herein disclosed features of structural novelty may be utilized in panelled structures generally wherein it may become desirable to effectively join adjacent panels and/or to effectively secure a panel or panels to a supporting member.

It is among the objects of the invention to provide panel securing means wherein spreadable clamping elements can effectively lock together edge portions of adjacent panels with the locking means substantially concealed yet readily operable from one side of the panel structure.

Another object of the invention is to provide a panel joint wherein an expandable clamp is operable between two members of which at least one is a panel member, for effecting rigid connection together of the two members with the expandable clamp substantially entirely between the planes of opposite faces of the panel member or members.

A further object of the invention is to provide a panel joint structure wherein clamping means insertible between adjacent edge portions of adjacent panels is operable from one side of the panels to effect rigid securement together of the panels with an effective seal at at least one side of the panels and extending throughout the length of said adjacent edge portions of the panels.

Yet another object of the invention is to provide a panel joining structure wherein each of adjacent edge portions of adjacent panels has a frame member flanged adjacent to opposite facing elements of the panel and wherein an expandable clamp is located between said flanged frame elements and is expandable from one side of the panels simultaneously into locking engagement with the flanges of both of said frame elements throughout the extent of said flanges at at least one flanged edge of each of the joined panels.

It is, moreover, my purpose and object generally to improve panel joining procedures and structures and more especially to provide improved panel joining means for panels having flanged frame elements for coaction with expandable insert clamping means.

In the accompanying drawing:

Fig. 1 is a plan view of fragments of two panels joined together along adjacent edges by means embodying features of the invention;

Fig. 2 is a fragmentary perspective view with portions in cross-section on line 2—2 of Fig. 1;

Fig. 3 is a fragmentary perspective view of the upper clamping member of Fig. 2, in cross-section near one of the screw holes therein;

Fig. 4 is a view generally similar to Fig. 2 but showing a modified form of the invention;

Fig. 5 is a perspective view on a smaller scale of a relatively short clamping member, a number of which may be distributed in spaced relation along the panel edges in place of the relatively long upper clamping member of Figs. 2 and 3;

Fig. 6 is a cross-sectional view on a still smaller scale showing how right-angularly related panels may be joined together; and Fig. 7 is a cross-sectional view showing how a panel may be secured to a supporting structure in accordance with teachings of the invention.

Referring to the drawing, two panels are indicated generally at 10 and 12 with adjacent edges thereof in spaced parallelism. Each panel comprises a rigid frame element 14 extending along an edge of the panel, with panel facing elements 16, 18 secured to the opposite edge portions of the frame elements. The opposite edge portions of each frame element 14 has a flange 20 thereon extending to opposite sides of a central web 15, and each flange 20 is channeled at 21 at each side of the adjacent web 15 with the channels of one flange 20 of a frame element 14 opposite and open toward the similar channels in the other flange of the same frame element.

According to the invention, the panels 10, 12 may be effectively and relatively quickly secured together by spreadable wedging or inside-clamping members 22, 24 inserted loosely between the adjacent frame elements 14 of the two panels and then spread apart, by screws 26, into locking engagement with the flanges 20 of the frame elements.

Clamping member 22 preferably will have length equal to or somewhat less than the length of the panel edges along which the panels are to be joined. Its under side, in Fig. 2, is provided with edge ribs 23 which are adapted to engage in the flange channels 21, one in a channel 21 of the frame element of panel 10 and the other in a channel 21 of the frame element of panel 12. Frequently, it is desirable to effect a seal at the panel joint, and this may be effectively accomplished by inserting a strip-form gasket 28 between the member 22 and the two flange portions with which member 22 engages, in which case the ribs 23 or the channels 21 will be formed to provide needed clearance so that the gasket will be effectively clamped before the ribs 23 engage the bottoms of the flange channels.

Clamping member 24 has edge ribs 25, comparable to the ribs 23 on member 22, for engaging in the channels 21 of the flanges 20 at the other side of the two panels. The screws 26 are threaded through holes 27 in member 24 and may be screwed inward until their inner ends engage the member 22, following which further inward screwing of the screws 26 spread members 22, 24 apart and into secure locking engagement with the flanges of panel elements 14. Any suitable number of screws 26 may be suitably spaced apart along the clamping member 24 at each panel joint with their heads accessible through the space at 30 between the adjacent edges of the joined panels.

Ordinarily, it will not be necessary to effect a seal at the location of clamping member 24. However, should a seal at this location be desirable, it may be accomplished by insertion of a strip-form gasket between the panel flanges and member 24 in a manner similar to what has been described in connection with strip-form gasket 28, in which case a rather precise dimensioning of screws 26 will be necessary to ensure effective sealing around the screw when clamping of the panels has been effected.

Also, in some cases, it may be found desirable to employ a series of relatively short clamping members spaced apart along the panel edges in place of the single long member 24. One such relatively short member 24' is represented in Fig. 5 with a threaded hole 27' therein for reception of a screw 26.

When joining structural panels to form walls or partitions of buildings, desired aesthetic effects frequently dictate that juncture regions of panel joints have the aspect of concavities rather than being flush joints or joints providing convex aspects. The panel joint of Figs. 1 and 2 provides such an aspect of concavity and the outer edges of the facing elements and flanges may be variously bevelled, as suggested by the dotted line at 32 in Fig. 2, to accentuate the concave effect. However, when desired, the space between the edges of the joined panels may be closed or covered by a strip 34 as in Fig. 4 with the screws 26' securing the strip 34 in place as well as serving to spread the clamping members.

Adjacent edges of angularly related panels may be joined together by utilizing two of the previously described panel clamps, in conjunction with a corner insert unit which is indicated generally at 36 in Fig. 6 wherein the two panels 10', 12' may be identical with panels 10, 12 but arranged at right angles to each other, or at any of various other permissible angles. The illustrated corner unit 36 comprises two frame elements 38, 40 which may be in all aspects the same as the panel frame elements 14 and substantially of the same length. Elements 38, 40 are right-angularly disposed, and an arcuate facing element 42 extends between their outer flanged edges and is secured thereto. The inner flanged edges of the elements 38, 40 may be rigidly connected together by an insert strip 44 suitably secured to the flanged edges. Panel 10' is shown joined to frame element 38 of unit 36 by one pair of clamping members 22, 24, and panel 12' is shown joined to frame element 40 of unit 36 by another pair of clamping members 22, 24, the clamping of the panels and corner unit 36 being effected by screws 26 the same as in the Figs. 1 and 2 embodiment.

Fig. 7 shows how a panel may be clamped along one edge to a fixed supporting element 46 of a building structure, or the like. A frame element 48, similar to the panel frame elements 14, may be permanently secured to supporting element 46 by any suitable means, and panel 10" then may be clamped to frame element 48, by clamping members 22, 24, in the same manner that the panels are secured together in Figs. 1 and 2. Actually, however, the particular variety of panel herein shown employs a core structure of angularly related frame elements generally similar to the panel frame elements 14 of Fig. 2 and the ends of these elements, or of particular ones of them, may have shape for slidably engaging and interlocking directly with the channelled flanges of a frame element 14, or 48 (Fig. 7), without need for intervening clamping members.

It should be understood that various changes in details of the herein disclosed structures may be made within the scope of the appended claims, and it is intended that the patent shall cover, by suitable expression in the appended claims, whatever features of novelty exist in the invention disclosed.

I claim as my invention:

1. A panel joint comprising a pair of similar generally rigid joint elements, one joint element constituting a frame of and extending along an edge of a panel, the other joint element extending in parallelism with said one element and spaced to provide access to the joint from the side of the panel throughout the length of said elements, each of said joint elements having opposite flanged edges, the flanges on the edges of the one projecting toward the flanges on the corresponding edges on the other of said elements with access space between them, opposed longitudinal channels in the said projecting flanges of each said element, a pair of clamping members arranged between the joint elements, said clamping members extending between and having means thereon simultaneously engaging each in the channels of the corresponding flanged edges of said spaced parallel joint elements, and means operable through said access space and threaded through one and engaging the other of said clamping members spreading them apart and into said engagement with the opposed channels of said joint elements thereby to secure said panel to said other rigid joint element.

2. A panel joint comprising a pair of similar generally rigid panel frame elements extending in spaced parallelism and to provide access space between said elements along adjacent edges of two panels which are to be joined together, each of said elements having opposite flanged edges, the flanges on the edges of the one projecting toward the flanges on the corresponding edges on the other of said frame elements and leaving between them space affording access to said joint from the side of said panel, opposed longitudinal channels in said projecting flanges of each said elements, a pair of clamp elements arranged between and having longitudinal ribs disposed in locking engagement in the channels at the corresponding ends of said frame elements, and means extending between and in thrust-apart relation to said clamp elements and manipulable from the panel side through said access space expanding said clamp elements into said locking engagement with the flanges of both said frame elements thereby rigidly securing together the two said panels.

3. A panel joint comprising a pair of similar generally rigid frame elements extending in spaced parallelism to provide access space between said elements along adjacent edges of two panels which are to be joined together, each of said frame elements having opposite flanged edges with the flanges at the corresponding edges projecting one toward the other with said access space between them, the opposite flanges of each said frame element defining opposed longitudinal channels, a rigid strip form member arranged between said frame elements and presenting longitudinal ribs in locking engagement in the corresponding channels at one edge of said frame elements, a co-acting member arranged between said frame elements and having longitudinal ribs thereupon in locking engagement in the corresponding channels at the other edge of said frame elements, and screw means threaded through one and abutting the other of said strip form and co-acting members and operable from the panel side and through the said access space forcing said members apart into said locking engagement of their ribs in said channels, thereby securing said panels rigidly together along adjacent edges thereof.

4. A panel joint comprising a pair of similar generally rigid panel elements extending in spaced parallelism to provide access space between said elements along adjacent edges of two panels which are to be joined together, each said element having opposite flanged edges, the flanges at the edges of one projecting toward the flanges at the corresponding edges of the other of said elements with said access space between them, a rigid strip form member arranged between said elements and engaging the corresponding flanges at one edge thereof, a co-acting member arranged between said elements and engaging the corresponding flanges at the other edge thereof, means closing across said access space between said flanged elements and approximately in the plane of one face of the two said panels, and a plurality of threaded elements threaded through said co-acting member and engaging said strip form member and operable from the panel side through said access space to force said members into locking engagement with the said corresponding flanges at said opposite sides of both said flanged members, said threaded elements having locking engagement also with said access space closing means.

References Cited in the file of this patent

UNITED STATES PATENTS

| 1,708,351 | Auld | Apr. 9, 1929 |
| 1,863,721 | Levene | June 21, 1932 |
| 2,007,618 | Snead | July 9, 1935 |
| 2,362,162 | Sheldon | Nov. 7, 1944 |

FOREIGN PATENTS

| 74,872 | Norway | Apr. 4, 1949 |